United States Patent [19]

House et al.

[11] Patent Number: 4,582,614

[45] Date of Patent: * Apr. 15, 1986

[54] COMPOSITIONS AND METHOD FOR THICKENING AQUEOUS BRINES

[75] Inventors: Roy F. House, Houston; Lonnie D. Hoover, Chappell Hill, both of Tex.

[73] Assignee: NL Industries, Inc., New York, N.Y.

[ * ] Notice: The portion of the term of this patent subsequent to Jul. 12, 2000 has been disclaimed.

[21] Appl. No.: 483,585

[22] Filed: Apr. 11, 1983

Related U.S. Application Data

[63] Continuation of Ser. No. 146,286, May 5, 1980, Pat. No. 4,392,964.

[51] Int. Cl.$^4$ ............................................... C09K 7/02
[52] U.S. Cl. .............................. 252/8.5 A; 252/8.5 C; 252/8.55 R; 252/363.5; 536/87
[58] Field of Search ............ 252/8.5 A, 8.5 C, 8.55 R, 252/363.5; 536/87, 96

[56] References Cited

U.S. PATENT DOCUMENTS

| | | | |
|---|---|---|---|
| 3,297,583 | 1/1967 | Dierichs et al. | 252/363.5 |
| 3,696,035 | 10/1972 | Nimerick | 252/8.55 |
| 3,852,201 | 12/1974 | Jackson | 252/8.5 |
| 3,898,165 | 8/1975 | Ely et al. | 252/8.55 |
| 3,922,173 | 11/1975 | Misak | 252/8.55 X |
| 3,991,241 | 11/1976 | Matsumoto et al. | 350/340 X |
| 4,046,197 | 9/1977 | Gruesbeck et al. | 252/8.5 X |
| 4,350,601 | 9/1982 | Mosier et al. | 252/8.55 |
| 4,392,964 | 7/1983 | House et al. | 252/8.5 |
| 4,415,463 | 11/1983 | Mosier et al. | 252/8.55 |

FOREIGN PATENT DOCUMENTS 2000799 1/1979 United Kingdom ............ 252/363.5

OTHER PUBLICATIONS

Natrosol, Hydroxyethylcellulose, publication by Hercules Inc., 1969, pp. 1-4 and 6-9.

*Primary Examiner*—Herbert B. Guynn
*Attorney, Agent, or Firm*—Browning, Bushman, Zamecki & Anderson

[57] ABSTRACT

A polymeric composition useful in the thickening of aqueous brines comprising hydroxyethyl cellulose, a water miscible organic liquid and an aqueous liquid.

18 Claims, No Drawings

COMPOSITIONS AND METHOD FOR THICKENING AQUEOUS BRINES

This is a continuation of application Ser. No. 146,286, filed May 5, 1980, now U.S. Pat. No. 4,392,964.

BACKGROUND OF THE INVENTION

The present invention relates to compositions for use as thickening agents in aqueous brine systems and to aqueous well servicing fluids prepared therefrom.

Thickened aqueous mediums, particularly those containing oil field brines, are commonly used as well servicing fluids such as drilling fluids, workover fluids, completion fluids, packer fluids, well treating fluids, subterranean formation treating fluids, spacer fluids, hole abandonment fluids, and other aqueous fluids in which an increase in viscosity is desired. It is known to use hydrophilic polymeric materials such as hydroxyethyl cellulose (HEC) as thickening agents for aqueous mediums used in such well servicing fluids. However, HEC is not readily hydrated, solvated or dispersed in certain aqueous systems without elevated temperatures and/or mixing under high shear for extended periods of time. For example, hydroxyethyl cellulose polymers are poorly hydrated, solvated or dispersed in aqueous solutions containing one or more multivalent cation water soluble salts, such as heavy brines having a density greater than about 11.7 ppg which are used in well servicing fluids. In many cases, as for example in workover operations, the equipment available for preparing the well servicing fluids does not readily lend itself to high temperature, high shear mixing. Accordingly, it is usually necessary, if it is desired to use such thickened brines to prepare them off the well site or to circulate the fluid in the hot borehole.

SUMMARY OF THE INVENTION

It is, therefore, an object of the present invention to provide new, polymeric compositions useful for thickening aqueous mediums, especially heavy brines having a density greater than 11.7 pounds per gallon.

A further object of the present invention is to provide an improved, aqueous well servicing fluid.

Another object of the present invention is to provide a method of preparing a well servicing fluid.

Still another object of the present invention is to provide a liquid polymeric composition which is pourable and pumpable, easily handled and which can be used to form thickened aqueous well servicing fluids under conditions of low shear mixing without the addition of heat.

The above and other objects of the present invention will become apparent from the description given herein and the appended claims.

In accordance with the present invention there is provided, in one embodiment of the invention, a polymeric composition for use in thickening aqueous brine mediums comprising HEC, a water miscible organic liquid, and an aqueous liquid.

In another embodiment of the present invention, the polymeric compositions described above can be admixed with an aqueous medium such as, for example, a heavy brine to produce well servicing fluids, e.g. a workover fluid.

In the method of the present invention, the polymeric composition is admixed and added to an aqueous brine to form a well servicing fluid.

DESCRIPTION OF THE PREFERRED EMBODIMENTS

The polymeric compositions of the present invention utilize, as a hydrophilic polymer, HEC as the primary component to provide the thickening effect. The HEC polymers are solid, particulate materials which are water soluble or water dispersible and which upon solution or dispersion in an aqueous medium increase the viscosity of the system. HEC polymers are generally high yield, water soluble, non-ionic materials produced by treating cellulose with sodium hydroxide followed by reaction with ethylene oxide. Each anhydroglucose unit in the cellulose molecule has three reactive hydroxy groups. The average number of moles of the ethylene oxide that becomes attached to each anhydroglucose unit in cellulose is called moles of substituent combined. In general, the greater the degree of substitution, the greater the water solubility. In general, it is preferable to use HEC polymers having as high a mole substitution level as possible.

Usually, upon the addition of dry, powdered hydrophilic materials, such as HEC, to aqueous mediums such as brines, the polymer particles undergo hydration preventing the interior of the particle from readily hydrating, solvating or otherwise dispersing in the aqueous medium. Accordingly, high shear, long mixing times and/or elevated temperatures must be applied in order to obtain a homogeneous system. It is a feature of the present invention that the polymeric compositions of the present invention readily hydrate, dissolve or disperse in such aqueous mediums at relatively low shear and ambient temperature.

Although the amount of HEC in the polymeric composition can vary widely depending on the viscosity of the composition desired, generally the HEC will be present in amounts of from about 3 to about 40% by weight of the composition, preferably from about 10 to about 30% by weight, most preferably from about 15% to about 25% by weight. It is preferred that the polymeric composition be pourable. This can be achieved by adjusting the relative concentrations of the HEC and the aqueous phase. The concentration of the aqueous phase must decrease in order to keep the viscosity constant, and vice versa.

In addition to the HEC, the polymeric compositions of the present invention contain a water miscible or soluble organic liquid which has no appreciable swelling effect on the HEC. It has been found preferable to employ organic liquids which have a carbon to oxygen ratio of less than about 6 and more preferably less than about 5, and more preferably in the range from 2 to 4. Also, the water soluble organic liquid is preferably soluble or at least dispersible in an aqueous brine having a density of greater than about 11.7 ppg (pounds per gallon). Non-limiting examples of typical organic liquids include isopropanol, 2-ethoxyethanol, 2-butoxyethanol, 2-isopropoxyethanol, n-butanol, sec-butanol, n-pentanol, and mixtures of the above and similar compounds. Specially preferred as the organic liquid is isopropanol (IPA). The organic liquid will generally be present in the polymeric composition in an amount of at least about 40% by weight and, more preferably, from about 50 to about 70% by weight. A test to determine useful water soluble organic liquids has been devised as follows: one (1) part by weight of HEC is spatulated with two (2) parts by weight of the organic liquid. This mixture is allowed to set for one (1) week at room temperature (72° F.) in a sealed container. Liquids useful in the polymeric compositions of this invention will have free liquid present in the mixture after the one week period. Liquids which swell the HEC appreciably will have no free liquid present and are unsuitable in this invention. However, minor amounts of water soluble organic liquids which have a swelling effect on HEC, such as ethylene glycol and glycerol, may be incorporated into the polymeric compositions. The concentration of such liquids will generally be less than about 20% by weight.

The aqueous liquid can be any water based mixture or solution which is compatible with the HEC. Thus, for example, the aqueous liquid can be fresh or pure water, sea water, an acidic solution, a basic solution, an aqueous salt solution, or suspension. Although virtually any inorganic or organic acid can be used if an acidic solution is desired, it is preferable to employ monobasic acids, particularly if the polymeric composition is to be added to aqueous brines containing multivalent cations. Non-limiting examples of suitable acids include hydrochloric acid, nitric acid, formic acid, acetic acid, etc. The basic materials which can be employed can be highly water soluble such as, for example, alkali metal hydroxides such as NaOH and KOH, $NH_4OH$ and the like or less soluble basic materials such as $Ca(OH)_2$, MgO and the like. Preferably, when a basic solution or suspension is employed, the concentration of the dissolved basic materials should be less than about 3.0N. Additionally, any aqueous salt solution can be utilized. Preferably the salt will be chosen from the group consisting of NaCl, KCl, $CaCl_2$, $CaBr_2$, $ZnCl_2$, $ZnBr_2$, and mixtures thereof. The amount of the aqueous liquid employed in the polymeric compositions can vary from about 3% by weight to about 40% by weight, preferably from about 10 to about 30% by weight.

The presence of bases or salts in the aqueous phase enables larger concentrations of aqueous phase to be incorporated into the polymer compositions. This is desirable from a cost standpoint. These solutions also activate the HEC faster than the use of plain water alone.

Additionally, the polymeric compositions may contain suspension additives to reduce syneresis and settling. The suspension additive should be a material which exhibits little or no absorption capacity for the organic liquids or the aqueous liquid and which is, in general, non-reactive with the HEC, the aqueous liquid or the organic liquid. Non-limiting examples of such inert suspension additives include bentonite, fumed silica, and hydrophilic polymers such as hydroxypropyl cellulose.

In the preparation of the polymeric composition, it is preferred to mix the HEC and water soluble organic liquid together before adding the aqueous liquid. For HEC which has not been surface treated to retard its hydration in aqueous systems, this is necessary in order to prevent the HEC from lumping. For surface treated HEC, this procedure is necessary when the aqueous phase contains base or high concentrations of certain salts as these aqueous systems enhance the hydration of the polymer.

While the polymeric compositions of the present invention are useful as thickeners or suspending agents in suspension fertilizers, liquid pesticides, liquid herbicides, and other aqueous systems which require viscosity enhancement, they are particularly useful in the preparation of well servicing fluids and, more particularly, well servicing fluids made from aqueous brines containing soluble salts such as, for example, a soluble salt of an alkali metal, an alkaline earth metal, a Group Ib metal, a Group IIb metal, as well as water soluble salts of ammonia and other cations. The thickener compositions are particularly useful in the preparation of thickened heavy brines, i.e. aqueous solutions of soluble salts of multivalent cations, e.g. Zn and Ca.

The most preferred thickened heavy brines, particularly those used for well servicing fluids, are made from brines having a density greater than about 11.7 pounds per gallon (ppg). Especially preferred heavy brines are those having a density of from about 12.0 to about 19.2 ppg which can comprise water solutions of a salt selected from the group consisting of calcium chloride, calcium bromide, zinc chloride, zinc bromide, and mixtures thereof.

It has been found that if the polymeric compositions or thickeners are aged before being added to heavy brines, the hydration rate in such brines is increased. Accordingly, although the polymer compositions or thickeners may be added to the heavy brines within several hours of their preparation and in some cases immediately, longer aging times increase the rate at which the thickeners hydrate in the heavy brines.

In formulating well servicing fluids from heavy brines, it is preferred that the polymeric composition be admixed with the aqueous brine so as to provide an HEC concentration in the well servicing fluid of from about 1 to about 3 pounds per barrel (ppb).

To more fully illustrate the present invention, the following non-limiting examples are presented. Unless otherwise indicated, all physical property measurements were made in accordance with testing procedures set forth in STANDARD PROCEDURE FOR TESTING DRILLING FLUID API RP 13B, Seventh Edition, April 1978.

EXAMPLE 1

The effect of the concentration and composition of the aqueous liquid in the activated polymeric compositions on the rate of viscosity development (polymer hydration) in a 16.0 ppg $CaBr_2/ZnBr_2$ brine was investigated. The samples were prepared by mixing the HEC and isopropanol together, adding the aqueous liquid, and mixing to thoroughly wet the HEC. The polymer compositions were evaluated at a concentration of 1.5 ppb HEC in a 16.0 ppg $CaBr_2/ZnBr_2$ solution by hand shaking the polymer composition and brine solution together for 30 seconds and stirring the mixture on a Fann V-G meter at 300 rpm. The 300 rpm dial reading was taken after certain time periods and after rolling the brines overnight at 150° F. The data are given in Table 1 below.

TABLE 1

Sample Composition: 20% NATROSOL 250 HHW, Indicated Concentration of Aqueous Phase, Remainder Isopropyl Alcohol

| | Aqueous Liquid | | 1.5 ppb HEC in 16.0 ppg Brine | | | | |
|---|---|---|---|---|---|---|---|
| Sample No. | NaOH Conc. | % Aqueous Phase | 300 rpm Reading Mixing Time, Minutes | | | | Qualitative Sample Viscosity |
| | | | 0 | 30 | 60 | A.R.[(1)] | |
| 1 | 0 | 5 | 12 | 21 | 28 | 127 | Pourable |
| 2 | 0 | 10 | 15 | 47 | 66 | 128 | Pourable |
| 3 | 0 | 15 | 18 | 55 | 76 | 135 | Pourable |
| 4 | 0 | 20 | 24 | 67 | 84 | 115 | Flowable |
| 4a | 0 | 25 | 9 | 15 | 15 | 33 | Gelled |
| 5 | 0.1N | 15 | 18 | 42 | 65 | 127 | Porable |

TABLE 1-continued

Sample Composition: 20% NATROSOL 250 HHW, Indicated Concentration of Aqueous Phase, Remainder Isopropyl Alcohol

| Sample No. | Aqueous Liquid NaOH Conc. | % Aqueous Phase | 1.5 ppb HEC in 16.0 ppg Brine 300 rpm Reading Mixing Time, Minutes | | | | Qualitative Sample Viscosity |
|---|---|---|---|---|---|---|---|
| | | | 0 | 30 | 60 | A.R.[1] | |
| 6 | 0.1N | 20 | 17 | 64 | 88 | 129 | Flowable |
| 7 | 0.1N | 25 | 19 | 59 | 86 | 114 | Gelled |
| 8 | 0.1N | 30 | 16 | 39 | 65 | 107 | Gelled |
| 9 | 0.25N | 15 | 18 | 51 | 68 | 127 | Pourable |
| 10 | 0.25N | 20 | 16 | 61 | 83 | 126 | Pourable |
| 11 | 0.25N | 25 | 18 | 60 | 84 | 124 | Flowable |
| 12 | 0.25N | 30 | 14 | 65 | 92 | 129 | Gelled |
| 13 | 0.5N | 15 | 16 | 52 | 70 | 123 | Pourable |
| 14 | 0.5N | 20 | 14 | 55 | 75 | 127 | Pourable |
| 15 | 0.5N | 25 | 16 | 61 | 85 | 121 | Pourable |
| 16 | 0.5N | 30 | 13 | 47 | 71 | 115 | Flowable |
| 17 | 1.0N | 15 | 13 | 28 | 38 | 115 | Pourable |
| 18 | 1.0N | 20 | 17 | 50 | 67 | 129 | Pourable |
| 19 | 1.0N | 25 | 16 | 55 | 78 | 116 | Pourable |
| 20 | 1.0N | 30 | 13 | 43 | 62 | 116 | Pourable |
| 21 | 2.0N | 25 | 17 | 36 | 45 | 119 | Pourable |
| 22 | 3.0N | 25 | 12 | 21 | 27 | 114 | Pourable |
| 23 | 4.0N | 25 | 11 | 18 | 25 | 97 | Gelled |
| 24 | 5.0N | 25 | 10 | 16 | 24 | 107 | Gelled |
| 25 | [2] | 20 | 14 | 49 | 72 | 126 | Pourable |
| 26 | [3] | 20 | 25 | 64 | 84 | 128 | Gelled |
| 27 | [4] | 20 | 27 | 72 | 89 | 131 | Flowable |
| [5] | — | — | 9 | — | — | — | — |

[1] Brine rolled overnight at 150° F.
[2] 0.25N KOH
[3] 0.93% Ca(OH)$_2$
[4] 0.5% MgO
[5] Brine solution only, no HEC

EXAMPLE 2

Ethylene glycol monobutyl ether (Butyl CELLOSOLVE), isopropanol and diesel oil were compared for use in the activated polymer compositions. The samples were prepared and evaluated as in Example 1. The data obtained, presented in Table 2, indicate that the organic liquid must be water soluble as the samples containing diesel oil gave very poor results. The data also indicate that the aqueous phase is necessary for activation of the polymer.

TABLE 2

Sample Composition: 20% HEC as Indicated, Indicated Concentration of Aqueous Phase, Remainder is the Indicated Organic Phase

| Sample No. | HEC Type | Organic Liquid** | NaOH Conc. | Aqueous Phase % Aqueous Phase | 1.5 ppb HEC in 16.0 ppg Brine 300 rpm Reading Mixing Time, Minutes | | | |
|---|---|---|---|---|---|---|---|---|
| | | | | | 0 | 30 | 60 | A.R.* |
| 1 | HHW | EGMBE | 0.1N | 25 | 13 | 43 | 58 | 125 |
| 2 | HHW | EGMBE | 0.25N | 25 | 17 | 61 | 79 | 128 |
| 3 | HHW | EGMBE | 0.25N | 30 | 14 | 45 | 62 | 125 |
| 4 | HHW | EGMBE | 1.0N | 15 | 12 | 25 | 30 | 121 |
| 5 | HHW | Diesel | 0 | 25 | 10 | 11 | 11 | 79 |
| 6 | HHW | Diesel | 0.25N | 25 | 9 | 9 | 9 | 61 |
| 7 | HHR | IPA | 0 | 10 | 13 | 26 | 34 | 118 |
| 8 | HHR | IPA | 0 | 15 | 17 | 50 | 66 | 124 |
| 9 | HHR | IPA | 0 | 20 | 18 | 47 | 65 | 128 |
| 10 | HHR | IPA | 0.25N | 24 | 15 | 39 | 63 | 116 |
| 11 | HHR | IPA | 0.25N | 23 | 15 | 44 | 64 | 121 |
| 12 | HHR | IPA | 0.25N | 22 | 15 | 38 | 60 | 123 |
| 13 | HHR | EGMBE | 0 | 15 | 14 | 30 | 39 | 124 |
| 14 | HHR | EGMBE | 0.25N | 30 | 17 | 37 | 47 | 117 |
| 15 | HHR | Diesel | 0 | 25 | 10 | 12 | 11 | 18 |
| 16 | HHR | Diesel | 0.25N | 25 | 23 | 18 | 20 | 80 |
| 17 | HHR | IPA | 0 | 0 | 9 | 9 | 9 | 80 |

*Brine rolled overnight at 150° F.
**EGMBE is Ethyleneglycol monobutyl ether; IPA is Isopropyl Alcohol; Diesel is Diesel Oil

EXAMPLE 3

The effect of aging of the activated polymer composition on the rate of hydration of the polymer in a heavy brine was investigated. The samples were prepared as in Example 1 and tested as in Example 1 after aging the number of hours indicated in Table 3. One sample was prepared at a temperature of about 150° F. The data obtained indicate that: the sample prepared with isopropyl alcohol required no aging for activation; the sample prepared with ethylene glycol monobutyl ether required 2 hours aging for *complete* activation; and the sample prepared at 150° F. was "super" activated.

TABLE 3

Sample Composition: 20% HHW, 25% 0.25N NaOH, 55% Organic Phase

| Sample No. | Organic Phase | 300 rpm | 1.5 ppb HEC in 16.0 ppg Brine Aging Time of Sample, Hours | | | | | | |
|---|---|---|---|---|---|---|---|---|---|
| | | | 0 | 1 | 2 | 3 | 4 | 5 | 16 |
| 1 | EGMBE | Initial | 12 | 14 | 21 | 19 | 15 | 20 | 21 |
| | | 30 Minutes | 47 | 48 | 75 | 65 | 66 | 68 | 58 |
| | | 60 Minutes | 65 | 69 | 90 | 83 | 86 | 83 | 82 |
| | | After Rolling at 150° F. | — | — | — | — | — | — | 133 |
| 2 | IPA | Initial | 14 | 13 | 18 | 17 | 15 | 18 | 15 |
| | | 30 Minutes | 59 | 53 | 60 | 60 | 62 | 58 | 56 |
| | | 60 Minutes | 83 | 78 | 83 | 83 | 84 | 80 | 81 |
| | | After Rolling at 150° F. | — | — | — | — | — | — | 121 |
| 3 | IPA* | Initial | 19 | 19 | 16 | 20 | 20 | 15 | — |
| | | 30 Minutes | 68 | 73 | 70 | 72 | 66 | 54 | — |
| | | 60 Minutes | 96 | 100 | 95 | 91 | 89 | 80 | — |
| | | After Rolling at 150° F. | — | — | — | — | — | 131 | — |

*Sample prepared at 180° F.

EXAMPLE 4

The effect of the water soluble organic liquid in the activated polymer compositions was evaluated. Samples were prepared and evaluated as in Example 1. The data obtained, given in Table 4, indicate that the water soluble organic liquid should have a carbon to oxygen ratio less than about 6, preferably less than about 5.

TABLE 4

Sample Composition: 20% NATROSOL 250 HHW; 25% 0.25N NaOH; 55% Indicated Diluting Agent

| Sample No. | Diluting Agent | 1.5 ppb HEC in 16.0 ppg Brine 300 rpm Fann Dial Reading Mixing Time, Minutes | | |
|---|---|---|---|---|
| | | 0 | 30 | 60 |
| 1 | Isopropyl alcohol | 27 | 66 | 93 |
| 2 | 2-ethoxy ethanol | 15 | 48 | 66 |
| 3 | 2-butoxy ethanol | 15 | 63 | 84 |

TABLE 4-continued

Sample Composition: 20% NATROSOL 250 HHW; 25% 0.25N NaOH; 55% Indicated Diluting Agent

| Sample No. | Diluting Agent | 1.5 ppb HEC in 16.0 ppg Brine 300 rpm Fann Dial Reading Mixing Time, Minutes | | |
|---|---|---|---|---|
| | | 0 | 30 | 60 |
| 4 | 2-isopropoxy ethanol | 18 | 63 | 83 |
| 5 | n-butanol | 15 | 33 | 51 |
| 6 | sec-butanol | 12 | 33 | 45 |
| 7 | n-pentanol | 12 | 27 | 36 |
| 8 | Mixed C$_6$—C$_{10}$ alcohols | 12 | 18 | 21 |
| 9 | 66% 2-ethoxy ethanol 34% isopropyl alcohol | 12 | 48 | 67 |
| 10 | polyethylene glycol, 1200 m.w. | * | * | * |

*HEC does not disperse and hydrate

EXAMPLE 5

Activated polymer compositions of this invention, prepared as in Example 1, were evaluated in several different heavy brines as follows:
15.0 ppg—Contains 16.3% CaCl$_2$, 43.2% CaBr$_2$, 40.5% H$_2$O
16.0 ppg—Contains 38.7% CaBr$_2$, 24.6% ZnBr$_2$, 36.7% H$_2$O
19.2 ppg—Contains 20% CaBr$_2$, 57% ZnBr$_2$, 23% H$_2$O
Excellent results were obtained. The data are given in Table 5.

TABLE 5

Sample Composition: 20% HEC as Indicated, 25% 0.25N NaOH, 55% Isopropyl Alcohol

| Sample No. | NATROSOL Type | Brine Density ppg. | 1.5 ppb HEC 300 rpm Reading | | | |
|---|---|---|---|---|---|---|
| | | | Mixing Time, Minutes | | | After Rolling |
| | | | 0 | 30 | 60 | |
| 1 | HHR | 15.0 | 48 | 148 | 199 | 227 |
| 2 | HHR | 16.0 | 22 | 65 | 95 | 132 |
| 3 | HHR | 19.2 | 58 | 153 | 206 | 216 |
| 4 | HHW | 15.0 | 48 | 155 | 202 | 243 |
| 5 | HHW | 16.0 | 26 | 66 | 93 | 131 |
| 6 | HHW | 19.2 | 61 | 159 | 197 | 222 |

EXAMPLE 6

Activated polymer compositions containing a buffered acidic aqueous liquid were prepared and evaluated as in Example 1. Each sample contained 20% NATROSOL 250 HHW, 25% aqueous liquid, and 55% isopropanol. The buffered acidic solutions were prepared as follows: 10 grams of Na$_4$P$_2$O$_7$10H$_2$O were dissolved in 80 grams of water followed by the addition of either hydrochloric acid or acetic anhydride to obtain a pH of 3. The data obtained are as follows:

| Acidic Solution | 1.5 ppb HEC in 16.0 ppg Brine 300 rpm Reading | | | |
|---|---|---|---|---|
| | Mixing Time, Minutes | | | After Rolling |
| | 0 | 30 | 60 | |
| HCl | 24 | 67 | 85 | 132 |
| Acetic | 13 | 44 | 63 | 128 |

EXAMPLE 7

In this Example, the effect of aging of the hydrated HEC on the activation of the HEC was determined. The data after rolling the brines at 150° F. indicates the viscosity obtained when the HEC is completely hydrated. Comparison of the data at room temperature with the data after rolling at 150° F. therefore indicates the relative activation of the HEC as a function of the concentration of water and as a function of aging ("activation") time.

Samples of the polymeric compositions were prepared and evaluated in the following manner:

I.
(a) 200 grams of the indicated solution of water in 99.9% isopropanol were mixed with 100 grams of HHR for 5 minutes on a Multimixer;
(b) 4.5 grams of each was mixed in 350 milliliters of each of the following brines for 5 minutes on a Multimixer:
  (1) 11.6 ppg CaCl$_2$—37.6% CaCl$_2$
  (2) 14.2 ppg CaBr$_2$—53% CaBr$_2$
  (3) 16.0 ppg CaBr$_2$/ZnBr$_2$—38.7% CaBr$_2$ + 24.6% ZnBr$_2$
  (4) 19.2 ppg CaBr$_2$/ZnBr$_2$—20% CaBr$_2$ + 57% ZnBr$_2$;
(c) The brines were placed on a Fann V-G Meter at 300 rpm and 600 and 300 rpm readings were obtained after 30 minutes and 60 minutes;
(d) The brines were rolled at room temperature for 3 hours and the 600 and 300 rpm viscosities obtained;
(e) The brines were rolled for 16 hours at 150° F., cooled to room temperature, and the viscosities were obtained.

II. The composition prepared in Ia was aged for 2 hours at room temperature and evaluated as in steps Ib-Ie.

III. The composition prepared in Ia was aged for 4 hours at room temperature and evaluated as in steps Ib-Ie.

TABLE 6

| Aging Time of Gellant Hr. | Brine ppg. | * Brine Treatment | Apparent Viscosity of 1.5 ppb HHR in Brine** % Deionized Water in 99.9% Isopropanol in the Composition | | | | | | | | | |
|---|---|---|---|---|---|---|---|---|---|---|---|---|
| | | | 0 | 1 | 2 | 3 | 4 | 5 | 6 | 10 | 15 | 20 |
| 0 | 11.6 | R.T. | 50 | 67 | 51 | 71 | (73) | 72 | (67) | 71 | 71 | 79 |
| 2 | 11.6 | R.T. | 68 | 71 | 74 | 64 | (79) | 61 | 71 | 64 | 71 | 73 |
| 4 | 11.6 | R.T. | 71 | 65 | 68 | (68) | (73) | 66 | 72 | 67 | 71 | 79 |
| 0 | 11.6 | 150° F. | 72 | 84 | 72 | 78 | (88) | 75 | (74) | 76 | 78 | 85 |
| 2 | 11.6 | 150° F. | 84 | 81 | 82 | 75 | (75) | 81 | 84 | 81 | 79 | 77 |
| 4 | 11.6 | 150° F. | 82 | 81 | 83 | 74 | (73) | 84 | 80 | 77 | 77 | 82 |
| 0 | 14.2 | R.T. | 25 | 29 | 28 | 32 | 31 | 40 | 51 | 66 | 64 | 64 |
| 2 | 14.2 | R.T. | 36 | 42 | 46 | 60 | 63 | 60 | 62 | 64 | 63 | 70 |
| 4 | 14.2 | R.T. | 44 | 56 | 57 | 66 | 65 | 53 | (66) | 70 | 72 | 74 |
| 0 | 14.2 | 150° F. | 78 | 86 | 78 | 80 | 72 | 82 | 88 | 80 | 81 | 81 |
| 2 | 14.2 | 150° F. | 83 | 82 | 79 | 86 | 71 | 82 | 84 | 81 | 75 | 79 |
| 4 | 14.2 | 150° F. | 85 | 84 | 84 | 88 | 77 | 71 | (80) | 83 | 82 | 85 |
| 0 | 16.0 | R.T. | 8 | 8 | 8 | 8 | 8 | 9 | 13 | 12 | 17 | 24 |

TABLE 6-continued

| Aging Time of Gellant Hr. | Brine ppg. | * Brine Treatment | Apparent Viscosity of 1.5 ppb HHR in Brine** % Deionized Water in 99.9% Isopropanol in the Composition | | | | | | | | | |
|---|---|---|---|---|---|---|---|---|---|---|---|---|
| | | | 0 | 1 | 2 | 3 | 4 | 5 | 6 | 10 | 15 | 20 |
| 2 | 16.0 | R.T. | 8 | 9 | 8 | 9 | 11 | 17 | 18 | 17 | (27) | 46 |
| 4 | 16.0 | R.T. | 9 | 10 | 9 | 10 | 11 | 13 | (13) | 22 | (38) | 53 |
| 0 | 16.0 | 150° F. | 78 | 67 | 64 | 68 | 74 | 80 | 72 | 76 | 78 | 62 |
| 2 | 16.0 | 150° F. | 73 | 67 | 76 | 67 | 72 | 87 | 85 | 85 | (84) | 82 |
| 4 | 16.0 | 150° F. | 77 | 82 | 76 | 77 | 82 | 88 | (76) | 88 | (86) | 87 |
| 0 | 19.2 | R.T. | 25 | 32 | 30 | 34 | 34 | 42 | 49 | 58 | 55 | 64 |
| 2 | 19.2 | R.T. | 43 | 44 | 54 | 47 | 52 | 58 | 60 | 70 | 85 | 96 |
| 4 | 19.2 | R.T. | 46 | 50 | 55 | 52 | 54 | 59 | 62 | 79 | 83 | 108 |
| 0 | 19.2 | 150° F. | 114 | 105 | 125 | 101 | 125 | OS | OS | 149 | 140 | 129 |
| 2 | 19.2 | 150° F. | OS | 139 | 132 | 129 | 121 | 148 | OS | 132 | 143 | 138 |
| 4 | 19.2 | 150° F. | 146 | 127 | 130 | 143 | 126 | 149 | 148 | 134 | 147 | 146 |

*R.T. = After mixing brine 60 minutes at 300 rpm at 74° F.
150° F = After rolling brine for 16 hours at 150° F.
**Data in parentheses are the averages of two separate sample determinations

TABLE 7

1.5 ppb HHR in 11.6 ppg Solution*
% Deionized Water in Isopropanol (99.9%)

| | 0 | 1 | 2 | 3 | 4 | 5 | 6 | 10 | 15 | 20 |
|---|---|---|---|---|---|---|---|---|---|---|
| NON-AGED SAMPLE | | | | | | | | | | |
| 30 Minutes | | | | | | | | | | |
| A.V. | 44 | 59 | 52 | 65 | (66) | 66 | (64) | 69 | 65 | 76 |
| P.V. | 32 | 40 | 37 | 46 | (48) | 50 | (46) | 49 | 50 | 58 |
| Y.P. | 24 | 39 | 31 | 38 | (38) | 32 | (36) | 40 | 31 | 36 |
| 60 Minutes | | | | | | | | | | |
| A.V. | 50 | 67 | 61 | 71 | (73) | 72 | (67) | 71 | 71 | 79 |
| P.V. | 32 | 46 | 40 | 51 | (47) | 53 | (43) | 45 | 49 | 56 |
| Y.P. | 36 | 43 | 42 | 41 | (52) | 38 | (48) | 52 | 44 | 47 |
| 4 Hours | | | | | | | | | | |
| A.V. | 60 | 74 | 66 | 74 | (81) | 68 | (72) | 76 | 70 | 81 |
| P.V. | 43 | 42 | 41 | 41 | (45) | 39 | (43) | 41 | 41 | 52 |
| Y.P. | 35 | 64 | 50 | 66 | (72) | 59 | (59) | 70 | 59 | 59 |
| 16 Hours at 150° F. | | | | | | | | | | |
| A.V. | 72 | 84 | 72 | 78 | (88) | 75 | (74) | 76 | 78 | 85 |
| P.V. | 42 | 47 | 40 | 42 | (46) | 43 | (43) | 42 | 44 | 46 |
| Y.P. | 61 | 74 | 64 | 71 | (83) | 64 | (63) | 68 | 68 | 78 |
| SAMPLE AGED 2 HOURS AT ROOM TEMPERATURE | | | | | | | | | | |
| 30 Minutes | | | | | | | | | | |
| A.V. | 59 | 64 | 71 | 58 | (70) | 63 | 68 | 62 | 68 | 70 |
| P.V. | 39 | 51 | 53 | 40 | (48) | 48 | 52 | 46 | 49 | 53 |
| Y.P. | 41 | 26 | 36 | 37 | (45) | 30 | 32 | 32 | 38 | 35 |
| 60 Minutes | | | | | | | | | | |
| A.V. | 68 | 71 | 74 | 64 | (79) | 67 | 71 | 64 | 71 | 73 |
| P.V. | 49 | 54 | 49 | 44 | (52) | 49 | 50 | 44 | 46 | 49 |
| Y.P. | 38 | 34 | 50 | 41 | (55) | 37 | 43 | 41 | 50 | 48 |
| 4 Hours | | | | | | | | | | |
| A.V. | 74 | 72 | 74 | 67 | (79) | 66 | 69 | 74 | 73 | 77 |
| P.V. | 45 | 41 | 42 | 41 | (44) | 38 | 40 | 44 | 40 | 44 |
| Y.P. | 58 | 62 | 64 | 53 | (69) | 57 | 59 | 60 | 67 | 67 |
| 16 Hours at 150° F. | | | | | | | | | | |
| A.V. | 84 | 81 | 82 | 75 | (75) | 81 | 84 | 81 | 79 | 77 |
| P.V. | 46 | 46 | 46 | 42 | (42) | 45 | 46 | 45 | 44 | 43 |
| Y.P. | 77 | 71 | 72 | 66 | (65) | 72 | 76 | 73 | 70 | 69 |
| SAMPLE AGED 4 HOURS AT ROOM TEMPERATURE | | | | | | | | | | |
| 30 Minutes | | | | | | | | | | |
| A.V. | 66 | 60 | 64 | (64) | (68) | 64 | 68 | 66 | 68 | 75 |
| P.V. | 46 | 45 | 49 | (46) | (51) | 47 | 51 | 48 | 51 | 60 |
| Y.P. | 40 | 31 | 30 | (35) | (36) | 35 | 34 | 37 | 34 | 31 |
| 60 Minutes | | | | | | | | | | |
| A.V. | 71 | 65 | 68 | (68) | (73) | 66 | 72 | 67 | 71 | 79 |
| P.V. | 51 | 46 | 49 | (46) | (51) | 44 | 50 | 42 | 53 | 58 |
| Y.P. | 40 | 39 | 39 | (44) | (44) | 45 | 44 | 50 | 37 | 42 |
| 4 Hours | | | | | | | | | | |
| A.V. | 73 | 71 | 70 | 75 | (75) | 73 | 70 | 72 | 72 | 80 |
| P.V. | 43 | 44 | 40 | 43 | (45) | 43 | 40 | 41 | 42 | 46 |
| Y.P. | 60 | 54 | 61 | 64 | (62) | 60 | 60 | 62 | 61 | 69 |
| 16 Hours at 150° F. | | | | | | | | | | |
| A.V. | 82 | 81 | 83 | 74 | (73) | 84 | 80 | 77 | 77 | 82 |
| P.V. | 46 | 46 | 47 | 42 | (41) | 47 | 46 | 43 | 42 | 45 |
| Y.P. | 72 | 71 | 73 | 64 | (62) | 74 | 69 | 69 | 71 | 75 |

*Data in parentheses are the average of two separate sample determinations

TABLE 8

1.5 ppb HHR in 14.2 ppg Solution*
% Deionized Water in Isopropanol (99.9%)

| | 0 | 1 | 2 | 3 | 4 | 5 | 6 | 10 | 15 | 20 |
|---|---|---|---|---|---|---|---|---|---|---|
| NON-AGED SAMPLE | | | | | | | | | | |
| 30 Minutes | | | | | | | | | | |
| A.V. | 21 | 25 | 26 | 29 | 28 | 36 | 48 | 67 | 61 | 60 |
| P.V. | 18 | 20 | 20 | 27 | 22 | 25 | 31 | 28 | 41 | 37 |
| Y.P. | 6 | 11 | 12 | 5 | 13 | 22 | 34 | 78 | 40 | 46 |
| 60 Minutes | | | | | | | | | | |
| A.V. | 25 | 29 | 28 | 32 | 31 | 40 | 51 | 66 | 64 | 64 |
| P.V. | 20 | 21 | 21 | 23 | 23 | 27 | 33 | 30 | 40 | 39 |
| Y.P. | 11 | 16 | 15 | 19 | 17 | 26 | 37 | 73 | 48 | 50 |
| 4 Hours | | | | | | | | | | |
| A.V. | 34 | 38 | 35 | 40 | 38 | 45 | 54 | 60 | 67 | 67 |
| P.V. | 24 | 25 | 24 | 27 | 25 | 29 | 37 | 34 | 37 | 39 |
| Y.P. | 21 | 26 | 23 | 27 | 26 | 32 | 34 | 52 | 60 | 56 |
| 16 Hours at 150° F. | | | | | | | | | | |
| A.V. | 78 | 86 | 78 | 80 | 72 | 82 | 88 | 80 | 81 | 81 |
| P.V. | 41 | 43 | 41 | 41 | 37 | 42 | 45 | 42 | 40 | 41 |
| Y.P. | 75 | 86 | 75 | 78 | 70 | 81 | 88 | 76 | 82 | 81 |
| SAMPLE AGED 2 HOURS AT ROOM TEMPERATURE | | | | | | | | | | |
| 30 Minutes | | | | | | | | | | |
| A.V. | 33 | 39 | 41 | 56 | 58 | 56 | 58 | 61 | 60 | 67 |
| P.V. | 23 | 26 | 28 | 35 | 41 | 38 | 38 | 38 | 37 | 45 |
| Y.P. | 20 | 26 | 26 | 42 | 35 | 37 | 40 | 46 | 46 | 45 |
| 60 Minutes | | | | | | | | | | |
| A.V. | 36 | 42 | 46 | 60 | 63 | 60 | 62 | 64 | 63 | 70 |
| P.V. | 24 | 28 | 30 | 38 | 42 | 40 | 40 | 39 | 40 | 44 |
| Y.P. | 25 | 29 | 32 | 45 | 42 | 41 | 44 | 50 | 46 | 53 |
| 4 Hours | | | | | | | | | | |
| A.V. | 45 | 49 | 51 | 67 | 66 | 62 | 66 | 67 | 65 | 72 |
| P.V. | 28 | 31 | 31 | 38 | 37 | 35 | 37 | 37 | 36 | 37 |
| Y.P. | 34 | 37 | 40 | 59 | 59 | 54 | 59 | 61 | 58 | 71 |
| 16 Hours at 150° F. | | | | | | | | | | |
| A.V. | 83 | 82 | 79 | 86 | 71 | 82 | 84 | 81 | 75 | 79 |
| P.V. | 43 | 42 | 42 | 42 | 36 | 43 | 43 | 41 | 39 | 41 |
| Y.P. | 80 | 81 | 74 | 88 | 71 | 79 | 82 | 81 | 73 | 76 |
| SAMPLE AGED 4 HOURS AT ROOM TEMPERATURE | | | | | | | | | | |
| 30 Minutes | | | | | | | | | | |
| A.V. | 40 | 51 | 53 | 60 | 60 | 49 | (60) | 67 | 70 | 72 |
| P.V. | 27 | 31 | 33 | 37 | 39 | 30 | (38) | 45 | 44 | 47 |
| Y.P. | 27 | 41 | 40 | 47 | 43 | 39 | (44) | 45 | 53 | 51 |
| 60 Minutes | | | | | | | | | | |
| A.V. | 44 | 56 | 57 | 66 | 65 | 53 | (66) | 70 | 72 | 74 |
| P.V. | 29 | 34 | 35 | 41 | 41 | 33 | (44) | 44 | 42 | 43 |

TABLE 8-continued

1.5 ppb HHR in 14.2 ppg Solution*
% Deionized Water in Isopropanol (99.9%)

| | 0 | 1 | 2 | 3 | 4 | 5 | 6 | 10 | 15 | 20 |
|---|---|---|---|---|---|---|---|---|---|---|
| Y.P. | 31 | 44 | 44 | 50 | 48 | 41 | (44) | 53 | 61 | 62 |
| 4 Hours | | | | | | | | | | |
| A.V. | 52 | 58 | 60 | 68 | 69 | 56 | (67) | 74 | 74 | 77 |
| P.V. | 31 | 34 | 33 | 37 | 38 | 34 | (37) | 40 | 38 | 39 |
| Y.P. | 42 | 48 | 55 | 63 | 62 | 44 | (60) | 68 | 72 | 77 |
| 16 Hours at 150° F. | | | | | | | | | | |
| A.V. | 85 | 84 | 84 | 88 | 77 | 71 | (80) | 83 | 82 | 85 |
| P.V. | 44 | 43 | 43 | 43 | 38 | 39 | (42) | 43 | 41 | 42 |
| Y.P. | 82 | 83 | 83 | 90 | 79 | 64 | (77) | 81 | 82 | 87 |

*Data in parentheses are the average of two separate sample determinations

TABLE 9

1.5 ppb HHR in 16.0 ppg Solution*
% Deionized Water in Isopropanol (99.9%)

| | 0 | 1 | 2 | 3 | 4 | 5 | 6 | 10 | 15 | 20 |
|---|---|---|---|---|---|---|---|---|---|---|
| NON-AGED SAMPLE | | | | | | | | | | |
| 30 Minutes | | | | | | | | | | |
| A.V. | 8 | 8 | 8 | 8 | 8 | 8 | 12 | 11 | 15 | 21 |
| P.V. | 9 | 8 | 8 | 8 | 8 | 9 | 12 | 12 | 15 | 19 |
| Y.P. | −1 | 0 | 0 | 1 | 1 | −1 | 0 | −1 | 1 | 4 |
| 60 Minutes | | | | | | | | | | |
| A.V. | 8 | 8 | 8 | 8 | 8 | 9 | 13 | 12 | 17 | 24 |
| P.V. | 9 | 8 | 8 | 8 | 8 | 9 | 13 | 12 | 16 | 20 |
| Y.P. | −1 | 0 | 1 | 1 | 1 | 0 | 0 | 0 | 3 | 9 |
| 4 Hours | | | | | | | | | | |
| A.V. | 8 | 8 | 8 | 8 | 9 | 10 | 14 | 14 | 20 | 39 |
| P.V. | 8 | 9 | 9 | 8 | 9 | 11 | 14 | 13 | 17 | 26 |
| Y.P. | 1 | −1 | −1 | 1 | 0 | −1 | 1 | 3 | 6 | 26 |
| 16 Hours at 150° F. | | | | | | | | | | |
| A.V. | 78 | 67 | 64 | 68 | 74 | 80 | 72 | 76 | 78 | 62 |
| P.V. | 40 | 38 | 39 | 39 | 38 | 43 | 40 | 43 | 43 | 41 |
| Y.P. | 56 | 58 | 51 | 58 | 73 | 75 | 64 | 66 | 71 | 81 |
| SAMPLE AGED 2 HOURS AT ROOM TEMPERATURE | | | | | | | | | | |
| 30 Minutes | | | | | | | | | | |
| A.V. | 8 | 9 | 8 | 8 | 10 | 10 | 17 | 16 | (22) | 42 |
| P.V. | 8 | 9 | 8 | 9 | 10 | 11 | 16 | 15 | (19) | 31 |
| Y.P. | 1 | 0 | 0 | −1 | 0 | −1 | 2 | 2 | (6) | 22 |
| 60 Minutes | | | | | | | | | | |
| A.V. | 8 | 9 | 8 | 9 | 11 | 11 | 18 | 17 | (27) | 46 |
| P.V. | 8 | 9 | 8 | 9 | 11 | 11 | 17 | 15 | (21) | 30 |
| Y.P. | 1 | 1 | 1 | 0 | 0 | 1 | 4 | 5 | (12) | 32 |
| 4 Hours | | | | | | | | | | |
| A.V. | 10 | 9 | 9 | 11 | 13 | 15 | 22 | 22 | (33) | 44 |
| P.V. | 10 | 9 | 9 | 12 | 12 | 14 | 18 | 17 | (24) | 32 |
| Y.P. | 0 | 1 | 1 | −1 | 2 | 2 | 9 | 10 | (19) | 24 |
| 16 Hours at 150° F. | | | | | | | | | | |
| A.V. | 73 | 67 | 76 | 67 | 72 | 87 | 85 | 85 | (84) | 82 |
| P.V. | 41 | 39 | 44 | 37 | 38 | 47 | 42 | 45 | (45) | 44 |
| Y.P. | 65 | 57 | 64 | 60 | 69 | 80 | 86 | 81 | (78) | 76 |
| SAMPLE AGED 4 HOURS AT ROOM TEMPERATURE | | | | | | | | | | |
| 30 Minutes | | | | | | | | | | |
| A.V. | 8 | 9 | 9 | 9 | 10 | 11 | (12) | 20 | (33) | 44 |
| P.V. | 8 | 9 | 9 | 10 | 10 | 12 | (12) | 18 | (25) | 33 |
| Y.P. | 1 | 1 | 0 | −1 | 0 | −1 | (0) | 4 | (15) | 23 |
| 60 Minutes | | | | | | | | | | |
| A.V. | 9 | 10 | 9 | 10 | 11 | 13 | (13) | 22 | (38) | 53 |
| P.V. | 9 | 10 | 10 | 11 | 11 | 13 | (13) | 19 | (28) | 36 |
| Y.P. | 0 | 0 | −1 | −1 | 0 | 0 | (0) | 6 | (22) | 35 |
| 4 Hours | | | | | | | | | | |
| A.V. | 11 | 11 | 12 | 12 | 13 | 16 | (16) | 25 | (46) | 51 |
| P.V. | 11 | 10 | 12 | 12 | 12 | 15 | (14) | 19 | (31) | 34 |
| Y.P. | 0 | 2 | 1 | 0 | 2 | 2 | (4) | 14 | (30) | 34 |
| 16 Hours at 150° F. | | | | | | | | | | |
| A.V. | 77 | 82 | 76 | 77 | 82 | 88 | (76) | 88 | (90) | 87 |
| P.V. | 42 | 42 | 43 | 38 | 41 | 45 | (43) | 48 | (47) | 45 |
| Y.P. | 71 | 80 | 67 | 58 | 82 | 87 | (66) | 81 | (87) | 85 |

*Data in parentheses are the average of two separate sample determinations

TABLE 10

1.5 ppb HHR in 19.2 ppg Solution*
% Deionized Water in Isopropanol (99.9%)

| | 0 | 1 | 2 | 3 | 4 | 5 | 6 | 10 | 15 | 20 |
|---|---|---|---|---|---|---|---|---|---|---|
| NON-AGED SAMPLE | | | | | | | | | | |
| 30 Minutes | | | | | | | | | | |

TABLE 10-continued 1.5 ppb HHR in 19.2 ppg Solution*
% Deionized Water in Isopropanol (99.9%)

| | 0 | 1 | 2 | 3 | 4 | 5 | 6 | 10 | 15 | 20 |
|---|---|---|---|---|---|---|---|---|---|---|
| A.V. | 21 | 25 | 23 | 26 | 27 | 30 | 33 | 38 | 36 | 42 |
| P.V. | 22 | 26 | 24 | 27 | 27 | 31 | 33 | 36 | 37 | 39 |
| Y.P. | −1 | −2 | −1 | −1 | 0 | −1 | 31 | 5 | −2 | 6 |
| 60 Minutes | | | | | | | | | | |
| A.V. | 25 | 32 | 30 | 34 | 39 | 42 | 49 | 58 | 55 | 64 |
| P.V. | 25 | 31 | 29 | 31 | 32 | 37 | 44 | 48 | 48 | 50 |
| Y.P. | 1 | 2 | 2 | 7 | 5 | 10 | 11 | 21 | 14 | 29 |
| 4 Hours | | | | | | | | | | |
| A.V. | 41 | 54 | 49 | 53 | 56 | 60 | 79 | 87 | 92 | 95 |
| P.V. | 34 | 43 | 39 | 42 | 43 | 47 | 57 | 59 | 64 | 62 |
| Y.P. | 14 | 23 | 21 | 23 | 26 | 27 | 45 | 57 | 57 | 67 |
| 16 Hours at 150° F. | | | | | | | | | | |
| A.V. | 114 | 105 | 125 | 101 | 125 | OS | OS | 149 | 140 | 129 |
| P.V. | 75 | 67 | 74 | 69 | 74 | OS | OS | 90 | 83 | 69 |
| Y.P. | 79 | 75 | 102 | 64 | 103 | OS | OS | 118 | 115 | 120 |
| SAMPLE AGED 2 HOURS AT ROOM TEMPERATURE | | | | | | | | | | |
| 30 Minutes | | | | | | | | | | |
| A.V. | 30 | 32 | 34 | 32 | 34 | 40 | 41 | 47 | 57 | 68 |
| P.V. | 31 | 33 | 33 | 33 | 34 | 38 | 42 | 44 | 54 | 55 |
| Y.P. | −1 | −2 | 2 | −1 | 0 | 5 | −1 | 7 | 6 | 26 |
| 60 Minutes | | | | | | | | | | |
| A.V. | 43 | 44 | 54 | 47 | 52 | 58 | 60 | 70 | 85 | 96 |
| P.V. | 38 | 42 | 45 | 46 | 46 | 49 | 51 | 54 | 66 | 69 |
| Y.P. | 10 | 5 | 18 | 2 | 13 | 19 | 19 | 32 | 38 | 54 |
| 4 Hours | | | | | | | | | | |
| A.V. | 68 | 70 | 82 | 81 | 87 | 91 | 99 | 95 | 110 | 113 |
| P.V. | 51 | 54 | 56 | 59 | 62 | 61 | 65 | 65 | 70 | 69 |
| Y.P. | 35 | 33 | 52 | 44 | 50 | 61 | 68 | 61 | 80 | 89 |
| 16 Hours at 150° F. | | | | | | | | | | |
| A.V. | OS | 139 | 132 | 129 | 121 | 148 | OS | 132 | 143 | 138 |
| P.V. | OS | 84 | 76 | 77 | 72 | 90 | OS | 79 | 85 | 78 |
| Y.P. | OS | 110 | 113 | 103 | 99 | 116 | OS | 106 | 116 | 121 |
| SAMPLE AGED 4 HOURS AT ROOM TEMPERATURE | | | | | | | | | | |
| 30 Minutes | | | | | | | | | | |
| A.V. | 32 | 34 | 35 | 37 | 35 | 38 | 41 | 55 | 58 | 75 |
| P.V. | 31 | 33 | 34 | 37 | 35 | 37 | 39 | 49 | 52 | 59 |
| Y.P. | 3 | 3 | 2 | 0 | 0 | 3 | 5 | 13 | 12 | 32 |
| 60 Minutes | | | | | | | | | | |
| A.V. | 46 | 50 | 55 | 52 | 54 | 59 | 62 | 79 | 83 | 108 |
| P.V. | 41 | 42 | 45 | 47 | 46 | 40 | 50 | 61 | 64 | 80 |
| Y.P. | 10 | 16 | 20 | 11 | 16 | 28 | 24 | 37 | 39 | 56 |
| 4 Hours | | | | | | | | | | |
| A.V. | 74 | 79 | 90 | 85 | 90 | 91 | 92 | 102 | 111 | 125 |
| P.V. | 54 | 55 | 64 | 61 | 63 | 64 | 61 | 67 | 71 | 75 |
| Y.P. | 40 | 49 | 52 | 49 | 55 | 54 | 62 | 70 | 81 | 101 |
| 16 Hours at 150° F. | | | | | | | | | | |
| A.V. | 146 | 127 | 130 | 143 | 126 | 149 | 148 | 134 | 147 | 146 |
| P.V. | 88 | 73 | 76 | 85 | 73 | 91 | 90 | 84 | 84 | 81 |
| Y.P. | 113 | 108 | 108 | 116 | 106 | 116 | 107 | 101 | 126 | 130 |

*Data in parentheses are the average of two separate sample determinations

The data in Table 6 summarize the data in Tables 7–10. The data indicate generally that: (1) brines having a density greater than 11.6 ppg require activation of the HEC; (2) the larger the concentration of water, the greater the activation of the HEC (subject to the limitation of forming a gel which does not disperse at low shear); and (3) the activation increases as the composition ages.

EXAMPLE 8

To 175 grams of ethylene glycol mono-n-butyl ether (EGMBE) were added 92.3 grams of water and 57.7 grams of 78% $CaCl_2$. After mixing for 2 minutes with a MultiMixer, 75 grams of NATROSOL 250 HHR was added. The mixture immediately thickened. While stirring with a variable speed LIGHTNIN mixer, an additional 50 grams of EGMBE was added to give a final concentration of HEC of 16⅜% by weight. A sample of a 16.0 ppg $CaBr_2/ZnBr_2$ solution containing 1 ppb HEC was prepared by hand shaking together 350 ml of a salt solution and 6 grams of the EGMBE-HEC thickener and stirring the mixture on a Fann V-G meter at 300 rpm. The 300 rpm dial reading was taken after certain time periods shown in Table 13 below. The API rheology was obtained on the viscosified brine after 60 minutes at 300 rpm after rolling the brine overnight at 150° F. The data obtained are given in Table 11 below.

TABLE 11

| Minutes @ 300 rpm | Fann V-G Meter 300 rpm Dial Reading |
|---|---|
| 0 | 9 |
| 10 | 18 |
| 20 | 25 |
| 30 | 33 |
| 60 | 51 |
| After Rolling API Rheology After 60 Minutes | 74 |

TABLE 11-continued

|  | Fann V-G Meter 300 rpm Dial Reading |
|---|---|
| AV | 41 |
| PV | 31 |
| YP | 20 |
| After Rolling at 150° F. | |
| AV | 53.5 |
| PV | 33 |
| YP | 41 |

EXAMPLE 9

Samples of thickeners prepared using various salt solutions as the aqueous liquid and having the following compositions were prepared by mixing together NATROSOL 250 HHR and isopropanol followed by the addition of the aqueous salt solution:

| Sample No. | % HEC | % IPA | % Aqueous | Aqueous Phase |
|---|---|---|---|---|
| A | 20 | 55 | 25 | 10.0 ppg NaCl (26% NaCl) |
| B | 20 | 55 | 25 | 11.6 ppg CaCl$_2$ (37.6% CaCl$_2$) |
| C | 20 | 50 | 30 | 14.2 ppg CaBr$_2$ (53% CaBr$_2$) |
| D | 20 | 40 | 40 | 19.2 ppg ZnBr$_2$/CaBr$_2$ (57% ZnBr$_2$, 20% CaBr$_2$) |

The above samples were evaluated as heavy brine viscosifiers using a 19.2 ppg (pounds per gallon) ZnBr$_2$/CaBr$_2$ solution as follows: 7.5 ppb of each sample (1.5 ppb (pounds per barrel) HEC) were mixed with the 19.2 ppg salt solution for 15 minutes on a MultiMixer. Thereafter, the brines were statically aged for 1 hour before obtaining the API rheology. The samples were rolled at 150° F. for 16 hours and the API rheology obtained after the samples cooled to room temperature. The data obtained are given in Table 12 below.

TABLE 12

| | API Rheology | | | | | |
|---|---|---|---|---|---|---|
| | Room Temperature | | | 16 Hours @ 150° F. | | |
| Sample | 600 | 300 | 3 | 600 | 300 | 3 |
| A | 265 | 182 | 27 | >300 | 218 | 40 |
| B | 245 | 161 | 20 | >300 | 209 | 36 |
| C | 259 | 175 | 24 | >300 | 213 | 38 |
| D | 236 | 161 | 21 | 289 | 200 | 34 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. A polymeric composition useful for thickening aqueous brines comprising from about 5 to about 30% by weight of hydroxyethyl cellulose, a water soluble organic liquid in an amount of at least about 40% by weight, and from about 3 to about 40% by weight of an aqueous solution or suspension of a basic material selected from the group consisting of alkali metal hydroxides, ammonium hydroxide, calcium hydroxide, magnesium oxide and mixtures therof, the concentration of the basic material dissolved in said solution or suspension being less than about 3.0N, wherein said organic liquid, when uniformly mixed with said hydroxyethyl cellulose in a weight ratio of hydroxyethyl cellulose to organic liquid of 1:2, produces a mixture with free liquid present after remaining quiescent for one week at ambient temperature in a sealed container.

2. The composition of claim 1 wherein said organic liquid has a carbon to oxygen ratio of less than about 6.

3. The composition of claim 1 wherein said organic liquid comprises isopropanol.

4. The composition of claim 1 wherein said organic liquid is soluble in a brine having a density of at least 11.7 ppg.

5. A well servicing fluid comprising:
   an aqueous brine; and
   a polymeric composition comprising from about 5 to about 30% by weight of hydroxyethyl cellulose, a water soluble organic liquid in an amount of at least about 40% by weight, and from about 3 to about 40% by weight of an aqueous solution or suspension of a basic material selected from the group consisting of alkali metal hydroxides, ammonium hydroxide, calcium hydroxide, magnesium oxide and mixtures therof, the concentration of the basic material dissolved in said solution or suspension being less than about 3.0N, wherein said organic liquid, when uniformly mixed with said hydroxyethyl cellulose in a weight ratio of hydroxyethyl cellulose to organic liquid of 1:2, produces a mixture with free liquid present after remaining quiescent for one week at ambient temperature in a sealed container.

6. The fluid of claim 5 wherein said aqueous brine comprises a solution of at least one water soluble salt of a multivalent metal.

7. The fluid of claim 5 wherein said aqueous brine has a density greater than about 11.7 ppg.

8. The fluid of claim 6 wherein said water soluble salt is selected from the group consisting of calcium chloride, calcium brommide, zinc chloride, zinc bromide, and mixtures thereof.

9. The fluid of claim 5 wherein the density of said aqueous brine is from about 12.0 ppg to about 19.2 ppg.

10. The composition of claim 5 wherein said organic liquid has a carbon to oxygen ratio of less than about 6.

11. The composition of claim 5 wherein said organic liquid comprises isopropanol.

12. The composition of claim 9 wherein said organic liquid is soluble in a brine solution having a density of at least 11.7 ppg.

13. A method of preparing a well servicing fluid comprising:
   forming a generally uniform polymeric composition by admixing from about 5 to about 30% by weight of hydroxyethyl cellulose, a water soluble organic liquid in an amount of at least about 40% by weight, and from about 3 to about 40% by weight of an aqueous solution or suspension of a basic material selected from the group consisting of alkali metal hydroxides, ammonium hydroxide, calcium hydroxide, magnesium oxide and mixtures therof, the concentration of said basic material dissolved in said solution or suspension being less than about 3.0N, wherein said organic liquid, when uniformly mixed with said hydroxyethyl cellulose in a weight ratio of hydroxyethyl cellulose to organic liquid of 1:2, produces a mixture with free liquid present after remaining quiescent for one week at ambient temperature in a sealed container; and admixing said polymeric composition with an aqueous brine.

14. The method of claim 13 wherein said polymeric composition is aged prior to admixing with said aqueous brine.

15. The fluid of claim 13 wherein said aqueous brine comprises a solution of at least one water soluble salt of a multivalent metal.

16. The fluid of claim 15 wherein said aqueous brine has a density greater than about 11.7 ppg.

17. The fluid of claim 16 wherein said water soluble salt is selected from the group consisting of calcium chloride, calcium bromide, zinc chloride, zinc bromide, and mixtures thereof.

18. The fluid of claim 13 wherein the density of said aqueous brine is from about 12.0 ppg to about 19.2 ppg.

* * * * *